(12) United States Patent
Gabl et al.

(10) Patent No.: US 6,669,025 B2
(45) Date of Patent: Dec. 30, 2003

(54) SCREEN

(75) Inventors: Helmuth Gabl, Graz (AT); Axel Pichler, Graz (AT); Alexander Gscheider, Hohentauern (AT)

(73) Assignee: Andritz AG, Graz (AT)

( * ) Notice: Subject to any disclaimer, the term of this patent is extended or adjusted under 35 U.S.C. 154(b) by 0 days.

(21) Appl. No.: 09/776,194

(22) Filed: Feb. 2, 2001

(65) Prior Publication Data

US 2001/0017274 A1 Aug. 30, 2001

(30) Foreign Application Priority Data

Feb. 3, 2000 (AT) .............................. 166/2000

(51) Int. Cl.[7] .................................. B07B 1/04
(52) U.S. Cl. .................. 209/273; 209/306; 209/389; 210/413
(58) Field of Search ................. 209/270, 273, 209/281, 283, 300, 305, 306, 379, 385, 389; 210/413, 414, 415

(56) References Cited

U.S. PATENT DOCUMENTS 3,053,391 A    9/1962  Nelson ............... 201/304
4,268,381 A  * 5/1981  Hooper ............... 209/273
5,064,125 A  * 11/1991 Hautala .............. 241/46.17
5,096,127 A  * 3/1992  Young ............... 209/273 X
5,318,186 A  * 6/1994  Rienecker .......... 209/306 X
5,575,395 A  * 11/1996 Alajaaski et al. .... 209/270 X
5,601,192 A  * 2/1997  Hutzler et al. ...... 209/300 X

FOREIGN PATENT DOCUMENTS

| EP | 0 541 979 A | 5/1993 | |
| EP | 0 795 641 A | 7/1997 | |
| EP | 0 955 406 A | 11/1999 | |
| SU | 606635 | * 5/1978 | ............ 209/273 |
| WO | WO 97 41296 A | 11/1997 | |
| WO | WO 99 45193 A | 9/1999 | |

OTHER PUBLICATIONS

EPO Search Report EP 1 122 358 A3, dated Oct. 2, 2001.

* cited by examiner

Primary Examiner—Tuan N. Nguyen
(74) Attorney, Agent, or Firm—Alix, Yale & Ristas, LLP

(57) ABSTRACT

A screen for cleaning a pulp suspension including an additional screen basket in the infeed area for pre-screening.

22 Claims, 6 Drawing Sheets

SCREEN

BACKGROUND OF THE INVENTION

This invention relates generally to apparatus for cleaning pulp suspensions. More particularly, the present invention relates to screens for cleaning pulp suspensions.

Screens are machines used in the paper industry for the purpose of cleaning a pulp suspension consisting of water, fibers and dirt particles. In doing so, a feed flow is led over a screening device, with the accept stream consisting of water and fibers flowing through the screen. A partial stream, called the reject stream, consisting of water, fibers and dirt particles, is generally withdrawn from the end located opposite the feed flow. So with a screen a separation of particles which are suspended in a liquid takes place. To the contrary with filtration the liquid is separated from the solids. Generally speaking, such a screen is designed rotationally symmetrically and consists of a casing with a tangentially arranged infeed, a cylindrical screen basket mostly with holes or vertical slots, and a revolving rotor. The rotor has the task of keeping the screen slots clear, and this is achieved by blades which rotate closely to the screen surface. The accept stream is collected in a so-called accept chamber, often one of a conical design, and extracted radially at some point. The reject stream is generally led to the screen basket side located opposite the feed, into a reject chamber, which is in most cases annular, and extracted from the chamber tangentially. Such a screen is known for instance from U.S. Pat. No. 4,268,381. The disadvantage of these screening machines consists in the risk of clogging at low flow rates occurring in the relatively large reject chamber. Also, non-uniform onflow to the screen basket and non-uniform flow conditions in the accept chamber, especially in the area of the accept discharge, occur.

SUMMARY OF THE INVENTION

The purpose of the invention is, therefore, to create an improvement of the flow conditions in the screen in order to decrease the energy used at increased production rate and dirt removal.

The invention is therefore characterized by an additional screen basket being provided in the infeed area for pre-screening. This allows to achieve better discharge in machine.

An advantageous advancement of the invention is characterized by the additional screen basket turning together with the rotor, with the additional screen basket possibly also being fixed.

A favorable variant of the invention is characterized by rotating blades being provided in the pre-screening area, whereby the blades can be arranged in the feed flow or in the accept flow.

A favorable advancement of the Invention is characterized by a stationary installation, which may be designed rotationally symmetrically, being provided in the infeed area between the tube branch and the end of the rotor. This gives a substantial improvement of the flow conditions and as a consequence, a reduction of the amount of energy used.

An advantageous advancement of the invention is characterized by the installation being a cone, a truncated cone, a hemisphere, a spherical segment, a spherical segment between two parallel circles, a paraboloid, or a hyperboloid of two sheets.

A favorable variant of the invention is characterized by the cone angle a amounting to between 10° and 60° for installations designed as a cone or truncated cone, with the axis of the infeed branch possibly being arranged in parallel to the cone shell A favorable, alternative variant of the invention is characterized by the installation being a spiral-shaped body, with the pitch of the spiral being selectable such that the flow speed in the infeed area is kept constant over the entire screen basket width.

An advantageous advancement of the invention is characterized by the installation being arranged concentrically.

An advantageous variant of the invention is characterized by the accept chamber being designed double-conically.

An advantageous advancement of the invention is characterized by the screen being designed as double machine.

A favorable advancement of the invention is characterized by the infeed taking place axially through the rotor.

A favorable variant of the invention is characterized by the drive-side rotor part being of the same height as or higher than the rotor part on the other side of the drive into which and through which the pulp flows.

A favorable variant of the invention is characterized by the infeed taking place centrally from the side.

An advantageous advancement of the invention is characterized by two accept discharges being provided.

An advantageous variant of the invention is characterized by the screen being arranged horizontally.

A favorable advancement of the invention is characterized by a screen basket for pre-screening, which turns together with the rotor, being provided in the infeed area, with rotating blades possibly being provided in the pre-screening area.

A favorable advancement of the invention is characterized by the rotor having several blades arranged at different heights and/or distributed over the circumference.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
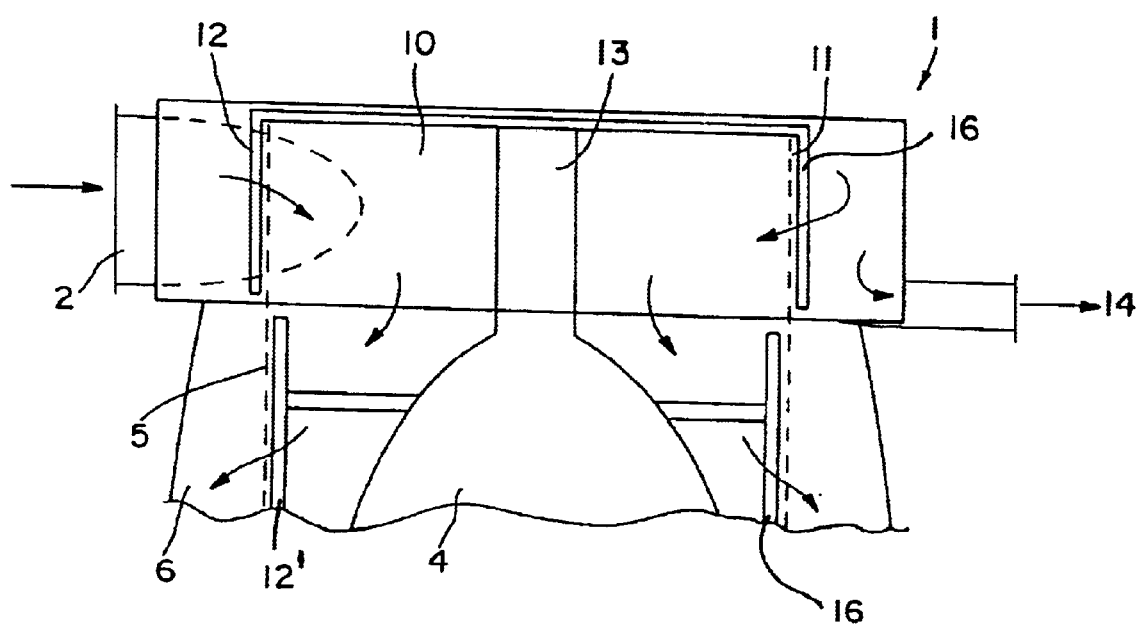
FIG. 1 is a cross-section view of a the top portion of a first embodiment of the invention.

FIG. 1 now shows the upper part of screen 1 arranged vertically with an integrated pre-screening. The pulp suspension is fed to the screen 1 via infeed branch 2. In order to discharge heavy particles in the area of the pre-screening, a pre-screening area 10 is provided in the upper part of screen 1, into which the suspension passes through a screen plate 11. The flow of the pulp suspension therefore is from the outside to the inside. This allows efficient removal of specifically heavy particles and large-surface contaminants, which result from dirty or very dirty pulps. There is a locked-in rotor 12 outside screen plate 11, i.e. on the feed side, this rotor being connected to rotor 4 via an extension 13. In an alternative variant, the rotor 12' may also be running inside the screen plate. The heavy particles leave the pre-screening area through branch 14. Rotor 12, 12' may be running in the pre-screening area 10 both in the infeed flow (as shown) or in the accept flow, which is then led to further fine screening in the lower area of the screen 1. If the rotor 12 runs in the infeed flow, then the rotating cleaner blades 16 of the rotor 12 keep the highly abrasive heavy particles from hitting and thereby damaging that surface of screen plate 11.

Figure 2:
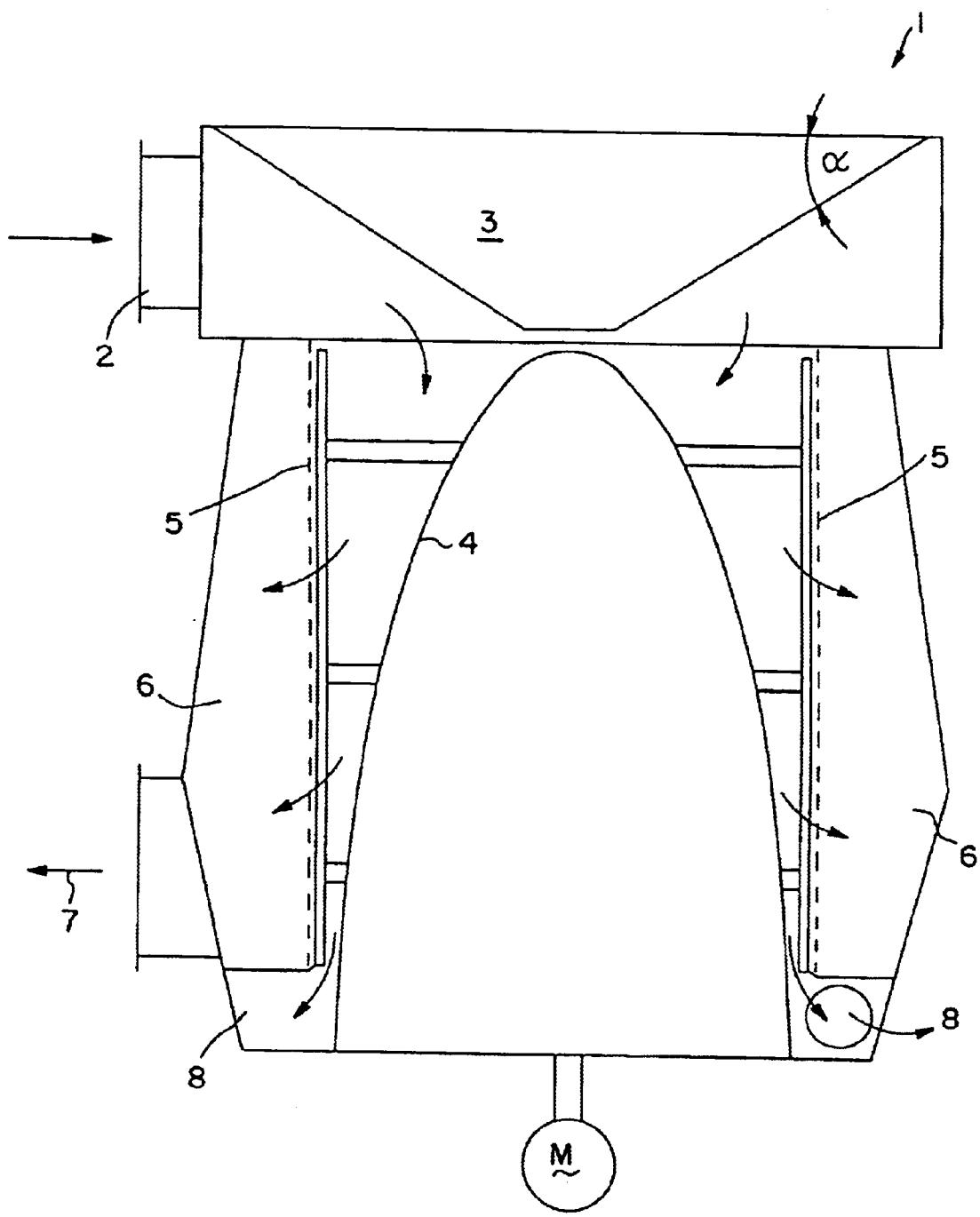
FIG. 2 is a cross-section view of a second embodiment of the invention.

The specifically heavy parts are thereby centrifuged outside. This allows to achieve longer useful life for the screen baskets in the pre-screening area, and on the other hand also to have a planned barrier in the form of the pre-screening basket as a consistent impediment for the heavy parts to pass into the centrifugal post-screening area. This means that the rotors, for the fact that they rotate in the first-stage accepts, are being loaded longer at the onflow edges and are therefore subject to less abrasion and energy consumption and can therefore be adjusted more closely to the surface of screen plate 5, without triggering damage to the rotor or screen plate surface. The separation of coarse and minor contaminants results in increased performance (throughput and effectiveness increase) in comparison to conventional screening machines. This variant can also be designed with a double-cone rotor for high production rates. The prescribed construction further makes possible a better and easier sealing and a better access for cleaning FIG. 2 shows a screen 1, to which a pulp suspension is fed for cleaning, through an infeed branch 2. In the area of the infeed, an installation 3 is provided, which is shown as a truncated cone. The "top" of the truncated cone points in the direction of the rotor 4. The flank angle α of the truncated cone amounts to between 10° and 60° in view of optimum deflection. The pulp suspension enters at the area between rotor 4 and screen plate 5 and is fed to the accept chamber 6 through the screen plate. The casing of the accept chamber is designed as a double cone, i.e. the casing tapers conically from about the upper edge of the accept outlet 7 toward the reject chamber, with the angle of the accept chamber being designed in view of a constant flow speed at an assumed uniform discharge through the screen plate.

For this, the rotor 4 of the screen 1 is designed for uniform screen onflow, which necessitates lower thickening behavior along the screen plate height. It is shaped as a parabola, and this means that the axial flow rate inside the screen basket remains constant at an assumed uniform outflow through the screen plate. As an alternative, the shape of the rotor may be approached through a conical shape.

To ensure suitable discharge of the reject flow, the reject chamber is designed such that flow rates above 2.5 m/sec. with or without additional introduction of agitating energy by the rotor are achieved. This virtually avoids clogging.

Figure 3:
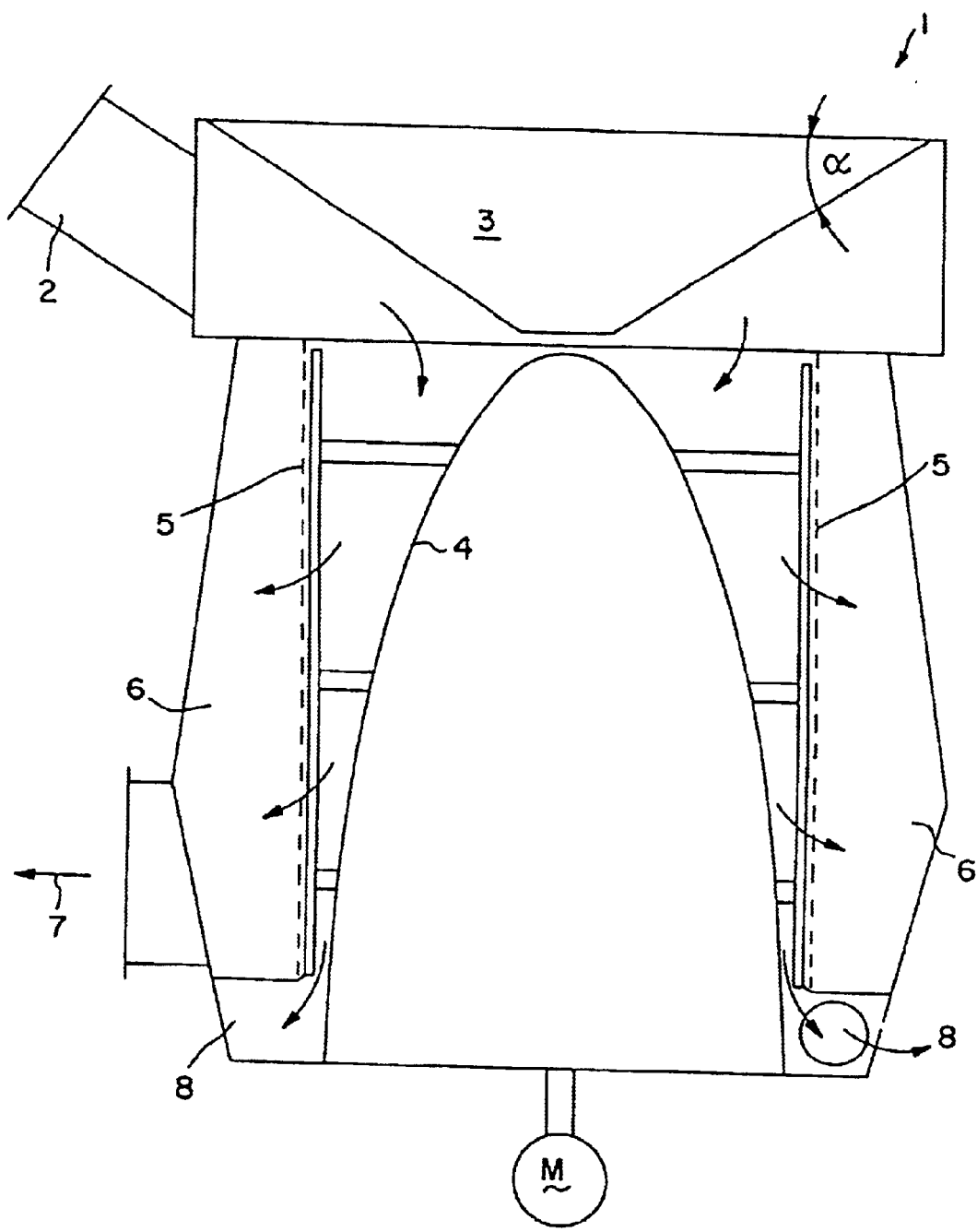
FIG. 3 is a cross-section view of a third embodiment of the invention.

FIG. 3 shows an alternate embodiment of a screen 1, with the infeed branch 2 being arranged such that the suspension is fed parallel to the shell 3 of the truncated cone 3. This means that the energy loss which normally exists in case of flow diversion can be avoided.

Figure 4:
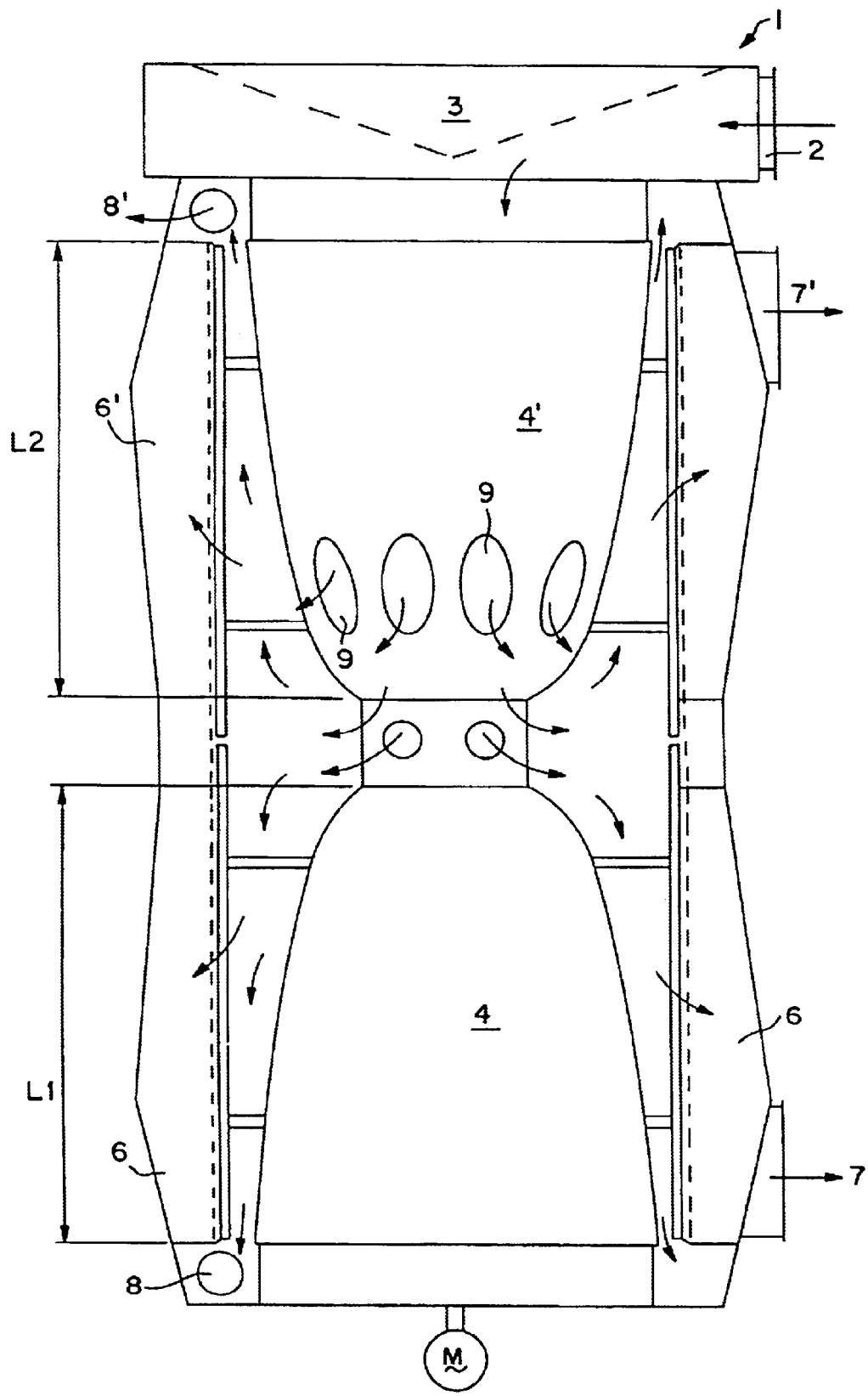
FIG. 4 is a cross-section view of a fourth embodiment of the invention.
Figure 5:
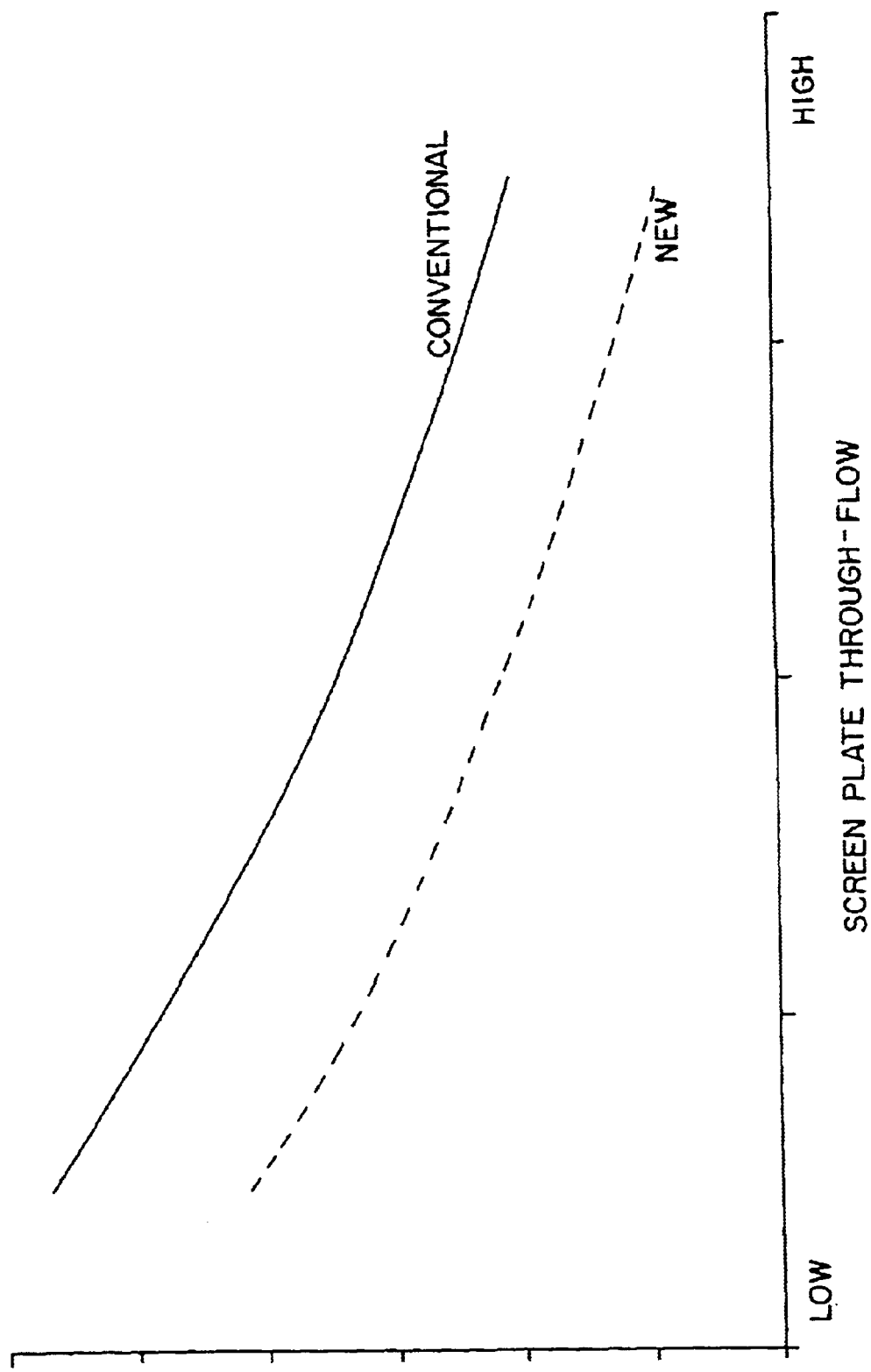
FIG. 5 is a graph showing the specific energy versus the screen plate flow.

The embodiment shown in FIG. 4 is used for high production rates. For this, the rotor is, for instance, designed as a double parabolic rotor 4, 4' or double-cone rotor. The reject discharge 8, 8' and the screen basket 5, 5' are also provided twice. Here, too, the accept chamber 6, 6' comes as a double cone, and this means in this case as well that the casing tapers approximately from the upper edge of the accept flow discharge 7 toward the reject chamber. The pulp suspension is also fed via infeed branch 2 and, in the configuration shown, routed axially through the rotor. With this type of inflow, the height L1 of driven end portion of the rotor part 4 is equal or larger than height L2 of the free end portion of the rotor part 4'. The suspension leaves the rotor part 4', through which the flow takes place, through openings 9 at the center and is distributed in both directions. It passes through the screen basket 5, 5' into accept chamber 6, 6', the same as for a single screen, this accept chamber being in this case also designed as a double cone. The reject flows both upwards and downwards and is in this case discharged from the machine via a reject chamber 8, 8'. In another configuration, the infeed may take place centrally from the side. There may be two accept discharges, one on top (7') and bottom (7) or a single one in the center. The screening device may be designed horizontally FIG. 5 is a graph comparing the energy requirement with the screen plate through-flow, with one curve being shown for conventional screens and one for screens according to the invention.

Figure 6:
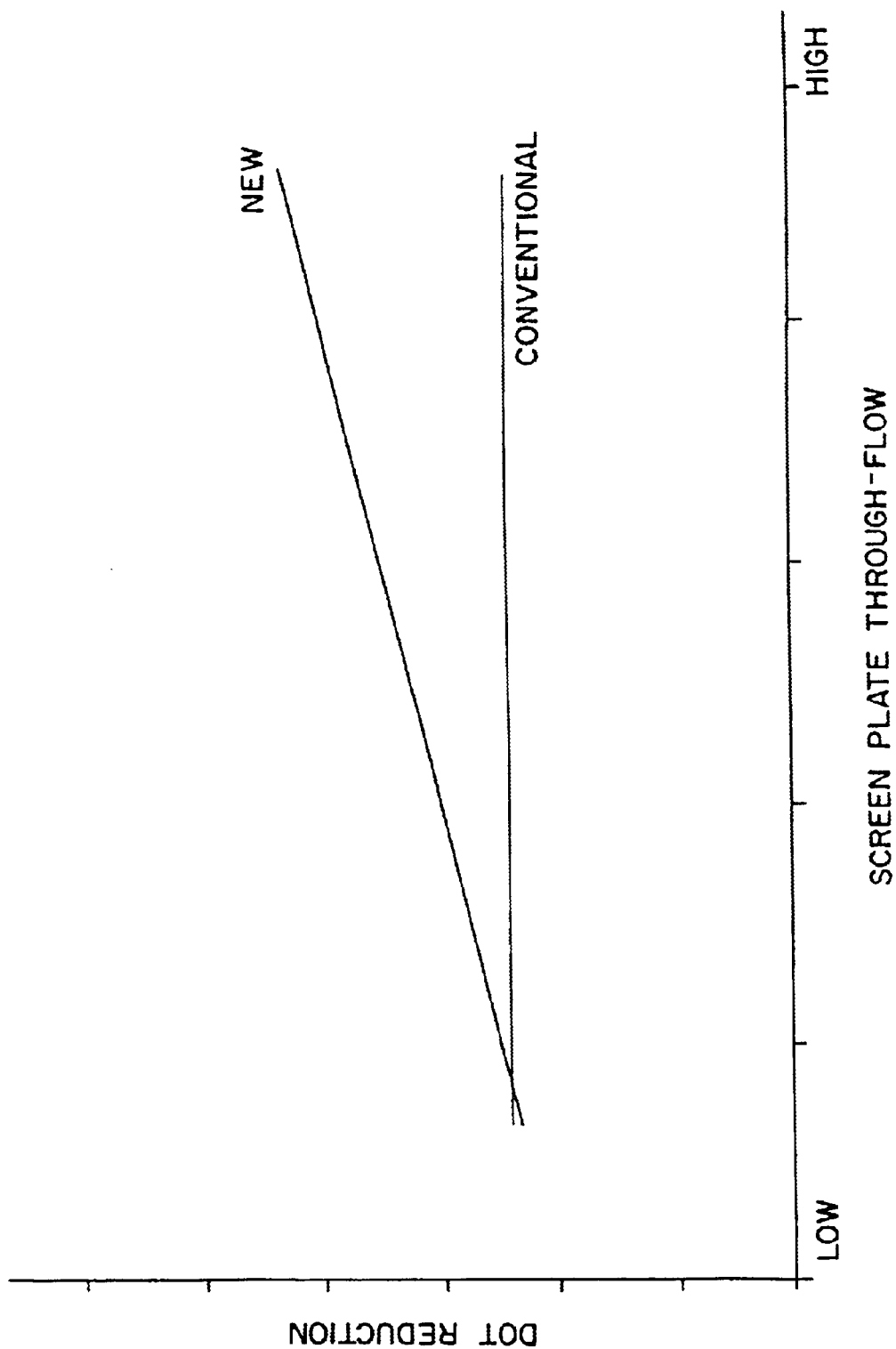
FIG. 6 a graph of the dots reduction versus the screen plate through flow.

FIG. 6 is a graph comparing the dot reduction with the screen plate through-flow. It can be seen here that with a conical installation in the infeed area, it was possible to improve the dot reduction substantially and to reduce the specific energy consumption at the same time.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. Screen for cleaning a pulp suspension comprising:
   an infeed branch adapted for receiving an infeed flow of pulp suspension;
   a rotatable rotor having a driven end and a free end;
   a first screen basket fixedly disposed within an infeed area between the infeed branch and the free end of the rotor, the first screen basket defining inner and outer cavities;
   a second screen basket disposed between the first screen basket and the driven end of the rotor, the second screen basket defining inner and outer cavities; and
   a plurality of rotating blades disposed in the infeed flow;
   wherein the inner cavity of the second screen basket is in fluid communication with the inner cavity of the first screen basket and no component of the screen is disposed between the inner cavities of the first and second screen baskets.

2. The screen according to claim 1, further comprising a stationary installation disposed within the infeed area.

3. The screen according to claim 2, wherein the installation is arranged concentrically.

4. The screen according to claim 2, wherein the installation is rotationally symmetrical.

5. The screen according to claim 4, wherein the installation has a shape selected from the group consisting of a cone, a truncated cone, a hemisphere, a spherical segment, a spherical segment between two parallel circles, a paraboloid, and a hyperboloid of two sheets.

6. The screen according to claim 4, wherein the installation is a cone or truncated cone having a cone angle substantially between 10° and 60°.

7. The screen according to claim 6, wherein the infeed branch has an axis which is substantially parallel to the installation.

8. The screen according to claim 1, wherein the flow of pulp suspension exiting the first screen basket is a first accept flow and the flow of pulp suspension exiting the second screen basket is a second accept flow, the outer cavity of the first screen basket receiving the infeed flow, the inner cavities of the first and second screen baskets receiving the first accept flow, and the outer cavity of the second screen basket receiving the second accept flow.

9. The screen according to claim 8, wherein the blades are disposed in the first accept flow.

10. The screen according to claim 8, wherein the outer cavity of the first screen basket has an annular-shape.

11. The screen according to claim 8, wherein the inner cavities of the first and second screen baskets each have a cylindrical-shape.

12. The screen according to claim 8, wherein the outer cavity of the second screen basket has a double-conical shape.

13. The screen according to claim 1, wherein the rotor has a driven end portion and a free end portion, each having a conical or parabolic shape with a wide end and an oppositely disposed narrow end, the narrow end of the free end portion being disposed adjacent the narrow end of the driven end portion.

14. The screen according to claim 13, further comprising first and second accept flows.

15. The screen according to claim 13, wherein the pulp suspension infeed is received axially through the rotor.

16. The screen according to claim 15, wherein the driven end portion of the rotor has a height L1 and the free end portion of the rotor has a height L2, where L1>L2.

17. The screen according to claim 16, wherein the pulp suspension infeed is received from the side proximate to the narrow ends of the driven and free end portions.

18. The screen according to claim 1, wherein the screen is disposed horizontally.

19. The screen according to claim 1, wherein the rotating blades are arranged at different heights.

20. The screen according to claim 1, wherein the rotating blades are distributed over the circumference of the pre-screening area.

21. Screen for cleaning a pulp suspension flowing therethrough, the screen comprising:

an infeed branch adapted for receiving an infeed flow of pulp suspension;

a rotatable rotor having a driven end and a free end;

a screen basket fixedly disposed within an infeed area between the infeed branch and the free end of the rotor, the screen basket defining a pre-screening area;

a plurality of rotating blades disposed in the infeed flow; and a double-conical accept chamber associated with the screen basket having an upstream section which widens in the flow direction of the pulp suspension and a downstream section which narrows in the flow direction of the pulp suspension.

22. Screen for cleaning a pulp suspension comprising:

an infeed branch adapted for receiving an infeed flow of pulp suspension;

a rotatable rotor having a driven end and a free end;

a first screen basket fixedly disposed within an infeed area between the infeed branch and the free end of the rotor, the first screen basket defining inner and outer cavities;

a second screen basket disposed between the first screen basket and the driven end of the rotor, the second screen basket defining inner and outer cavities;

a first set of rotating blades disposed intermediate the infeed branch and the first screen basket; and a second set of rotating blades disposed within the inner cavity of the second screen basket;

wherein the inner cavity of the second screen basket is in fluid communication with the inner cavity of the first screen basket and no component of the screen is disposed between the inner cavities of the first and second screen baskets.

* * * * *

UNITED STATES PATENT AND TRADEMARK OFFICE
CERTIFICATE OF CORRECTION

PATENT NO. : 6,669,025 B2
DATED : December 30, 2003
INVENTOR(S) : Gabl et al.

It is certified that error appears in the above-identified patent and that said Letters Patent is hereby corrected as shown below:

<u>Column 5,</u>
Line 34, delete ">" and replace with -- $\geq$ --.

Signed and Sealed this

Fifteenth Day of March, 2005

JON W. DUDAS
*Director of the United States Patent and Trademark Office*